United States Patent [19]

Dunn

[11] 4,352,064
[45] Sep. 28, 1982

[54] DEVICE FOR MEASURING THE SPEED OF AN OBJECT TRAVELING BETWEEN TWO FIXED POINTS FROM A STATIONARY OBSERVATION POINT

[76] Inventor: Ervin T. Dunn, 3003 Overlook Rd., #15, Boise, Id. 83704

[21] Appl. No.: 44,489

[22] Filed: Jun. 1, 1979

[51] Int. Cl.³ .......................... G01P 3/66; G01B 9/00
[52] U.S. Cl. ................................... 324/178; 364/565
[58] Field of Search ............... 324/160, 161, 178, 180; 346/18; 364/561, 565, 705; 368/108, 110, 113, 114, 118, 119

[56] References Cited

U.S. PATENT DOCUMENTS

| | | | |
|---|---|---|---|
| 3,530,382 | 9/1970 | Liston et al. | 324/178 |
| 4,022,014 | 5/1977 | Lowdenslager | 364/705 |
| 4,220,996 | 9/1980 | Scarcy | 364/561 |

*Primary Examiner*—Gerard R. Strecker
*Assistant Examiner*—Walter E. Snow
*Attorney, Agent, or Firm*—Carl A. Forest

[57] ABSTRACT

A hand-held electronic instrument to be used for timing target vehicles. The instrument has the ability to determine a comparison time-speed number by multiplication of a known speed of a setup vehicle by the length of time the setup vehicle takes to travel between two selected fixed points. The instrument has a memory for storing a comparison time-speed number, a timer, a manually operated first-fixed-point switch, a manually operated second-fixed-point switch, a divide circuit and a speed readout display. The first-fixed-point switch is pressed to start the timer when a target vehicle passes the first fixed point. When the target vehicle passes the second fixed point the second-fixed-point switch is pressed which stops the timer, and causes the instrument to divide the comparison time speed number by the output of the timer and to display the resulting speed.

9 Claims, 10 Drawing Figures

DEVICE FOR MEASURING THE SPEED OF AN OBJECT TRAVELING BETWEEN TWO FIXED POINTS FROM A STATIONARY OBSERVATION POINT

BACKGROUND OF THE INVENTION

The invention in general relates to apparatus for measuring the average speed of a target vehicle. More particularly it relates to a hand-held electrical apparatus for determining from a fixed observation post the distance between two fixed points along a highway then measuring the average speed of one or more target vehicles passing between those two fixed points. An example of two such fixed points would be two telephone posts along a highway.

Devices for measuring the average speed of a vehicle moving along a roadway are widely used by police officers in determining if target vehicles are exceeding the legal speed limit. One such commonly used apparatus is the conventional police radar unit. Another such apparatus is described in U.S. Pat. No. 3,530,382. These devices have several disadvantages: both are relatively large and bulky and generally require mounting in a vehicle which increases the visibility of the operator and thus reduces the effectiveness as a law enforcement tool; both are relatively complex and expensive limiting their availability; the radar can be defeated by radar warning devices; the device of U.S. Pat. No. 3,530,382 must be used in a vehicle traveling relatively closely behind the target vehicle, further contributing to the reduction in effectiveness.

Other U.S. Pat. Nos. relating to speed detection devices are 3,506,809; 3,406,395; and 1,676,965. All of these patents involve relatively complex devices each having objectives different from the present invention.

Because the apparatus of the invention is hand held and relatively inexpensive, it will have many more uses than the previous art. As just one example, spectators at races will find it useful for measuring the speed of the vehicles participating in the race, if an official comparison run is made around the track beforehand.

SUMMARY OF THE INVENTION

It is an object of the invention to provide apparatus for measuring the speed of a target vehicle which apparatus may be held in one hand.

It is another object of the invention to provide apparatus for measuring the speed of a target vehicle that may be employed from relatively inconspicuous locations displaced from the roadway upon which the target vehicle is traveling.

Another object of the invention is to provide a simple, accurate and expedient means of measuring the distance between a first fixed object and a second fixed object from an observation post, which distance may be used for determining the speed of a target vehicle.

A further object of the invention is to provide a relatively simple and inexpensive digital electronic apparatus for measuring the speed of a target vehicle.

Still another object of the invention is to provide digital electronic apparatus that employs dual circuits for measuring the speed of two vehicles at the same time, such as vehicles traveling in two different directions and two different lanes on a highway.

The invention provides a hand held electronic apparatus having a time-speed unit storage means, a means for entering a comparison time-speed unit into the means for storing, a time pulse generating means, and means for counting the time pulses. There is a manually operated first-fixed-point switch for initiating the time counter means and a manually operated second-fixed-point switch for terminating the time counter means to determine a time count unit. There is provided a divide circuit means for dividing the comparison time-speed unit by the time count unit to provide an average speed unit, and a readout means for displaying the speed unit. Preferably the comparison time-speed unit storage means is a digital memory, the means for entering the comparison time-speed unit in the memory includes a keyboard, and the time count unit is stored with appropriate scale factors so that the speed displayed is in miles per hour.

Numerous other features, objects and advantages of the invention will now become apparent from the following detailed description when read in conjunction with the accompanying drawing, in which:

DESCRIPTION OF THE PREFERRED EMBODIMENT

Figure 1:
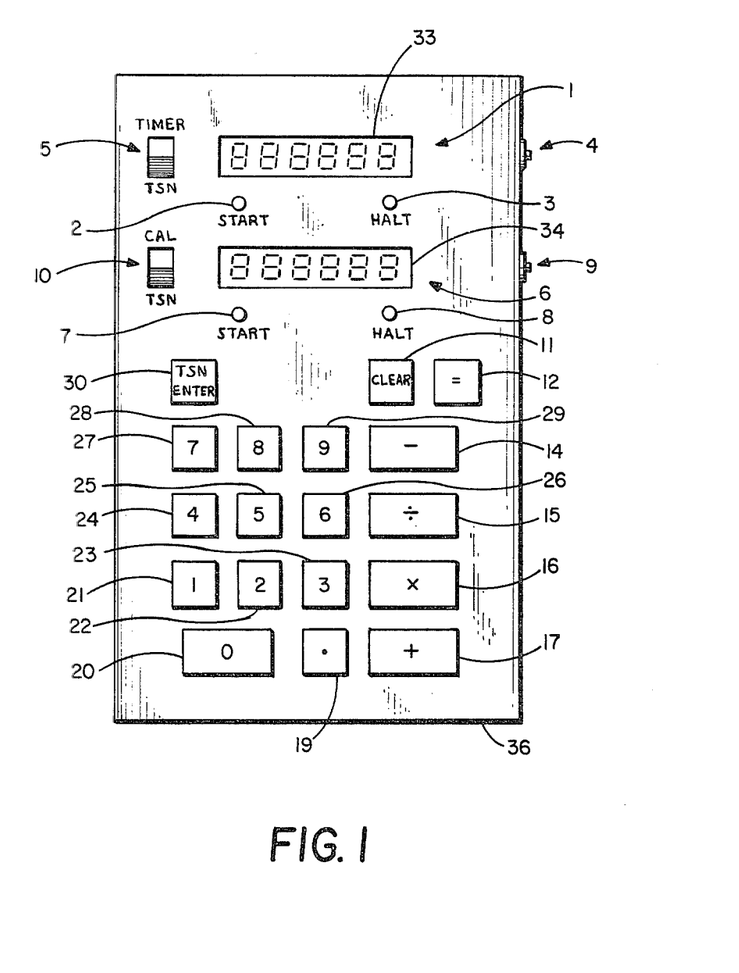
FIG. 1 is an external illustration of the invention showing one embodiment of the keyboard, switches and readout.

Directing attention to the drawing, FIG. 1 illustrates the external arrangement of the preferred apparatus according to the invention for measuring the average speed of a target vehicle. The invention comprises two independent speed measuring systems, one associated with display readout means 1, first-fixed-point switch 2, second-fixed-point switch 3, on-run-off switch 4 and time-speed-number (TSN) switch 5 which we shall label as system A, and the second associated with display readout means 6, first-fixed-point switch 7, second-fixed-point switch 8, on-run-off switch 9 and TSN switch 10 which we shall label as system B. The average speed of a target vehicle appears in display 1 if the first-fixed-point switch 2 is pressed when the target vehicle passes the first fixed point and the second-fixed-point switch 3 is pressed when the target vehicle passes the second fixed point. Similarly the average speed appears in display 6 if fixed-point switches 7 and 8 are used. The two systems, A and B, permit speeds of two target vehicles moving in different directions along a highway to be measured simultaneously. A more detailed description of the operation of the invention will be presented after the detailed description of the electronics of the invention.

Function keys 11 12, and 14 through 17 may be utilized when switch 10 is in the calculator (upper) position.

Numeric keys 19 through 29 and TSN enter key 30 are used when entering the comparison time-speed unit into the invention during the setup process in preparation for measuring speeds. Key 30 is used only when the TSN is entered manually with no setup run (using a setup car) being necessary. In addition numeric keys 19 through 29 may be utilized when switch 10 is in the calculator position.

Figure 2:
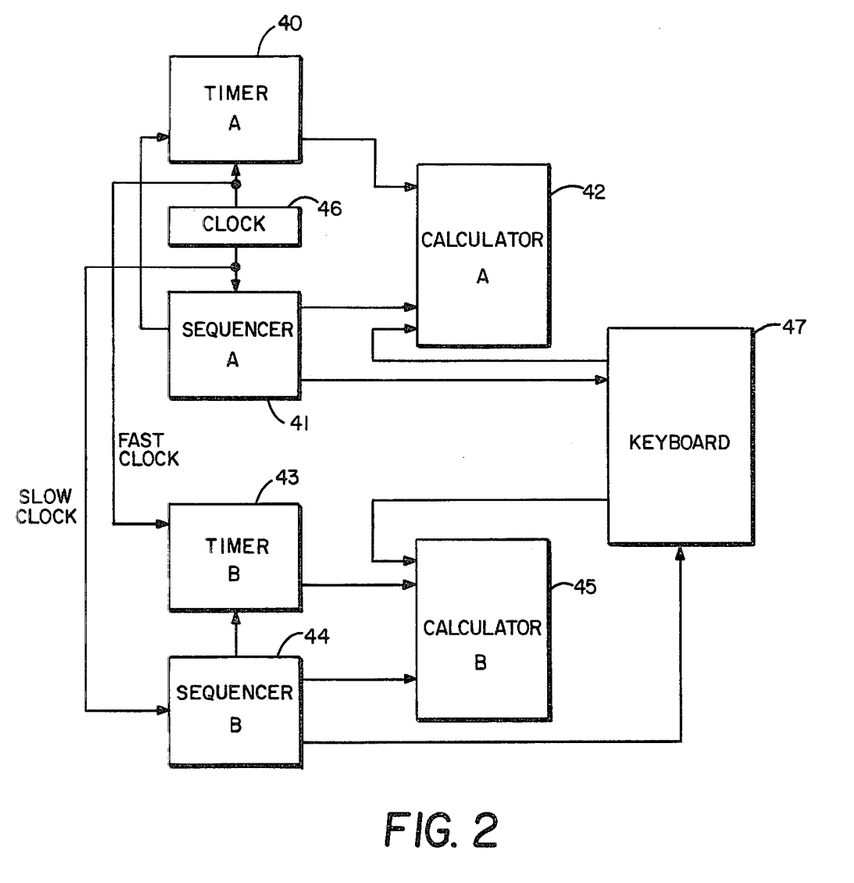
FIG. 2 shows in block format an embodiment of the circuitry of the invention.

Referring not to FIG. 2, an embodiment of the circuitry of the invention is shown in block format. Time counter means (timer) 40, sequencer means 41 and calculator 42 comprise the circuit for measuring system A of the invention and time counting means (timer) 43, sequencer means 44, and calculator 45 comprise the circuit of system B of the invention. Both systems are responsive to signals from time pulse generating means 46 and keyboard 47.

For purposes of the discussion switches 2, 3, and 5 are considered to be part of sequencer 41 and switches 7, 8, and 10 are considered part of sequencer 44, while display 1 is considered to be part of calculator 42 and display 6 is considered to be part of calculator 45. Power switches 4 and 9 are not shown in FIG. 2.

One signal from time pulse generating means (clock) 46, called the slow clock signal, is applied to sequencers 41 and 44 to trigger the sequencer operations. Another signal from clock 46, called the fast clock signal, is applied to timers 40 and 43 to provide a time pulse to be counted by the counters.

At the initiation of the use of system A, a signal from sequencer 41 is applied to keyboard 47 to enable the keyboard so that it communicates with calculator 42. Signals from sequencer 41 are also applied to timer 40 to initiate and halt the time count and to read the contents of timer 40 into calculator 42. In addition, signals from sequencer 41 are applied to calculator 42 to cause calculator 42 to enter the comparison time-speed unit (TSN unit) into the calculator memory in the course of the setup operation, and to divide the TSN unit by the contents of the counter and to readout the speed during the measuring operation.

Similarly when system B is being operated, signals from sequencer 44 are applied to keyboard 47, timer 43 and calculator 45 for the same purposes just described.

Figure 3:
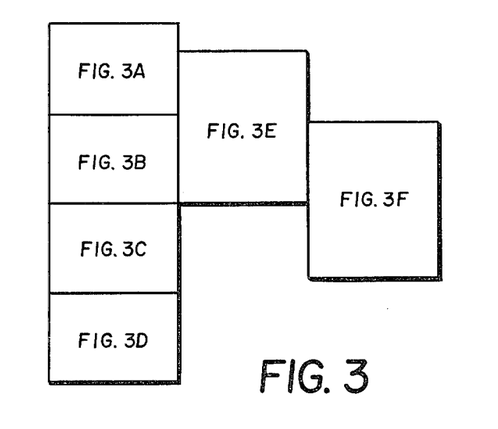
FIG. 3 shows the arrangement of FIGS. 3A through 3F which in turn show a more detailed circuit of the invention.
Figure 3A:
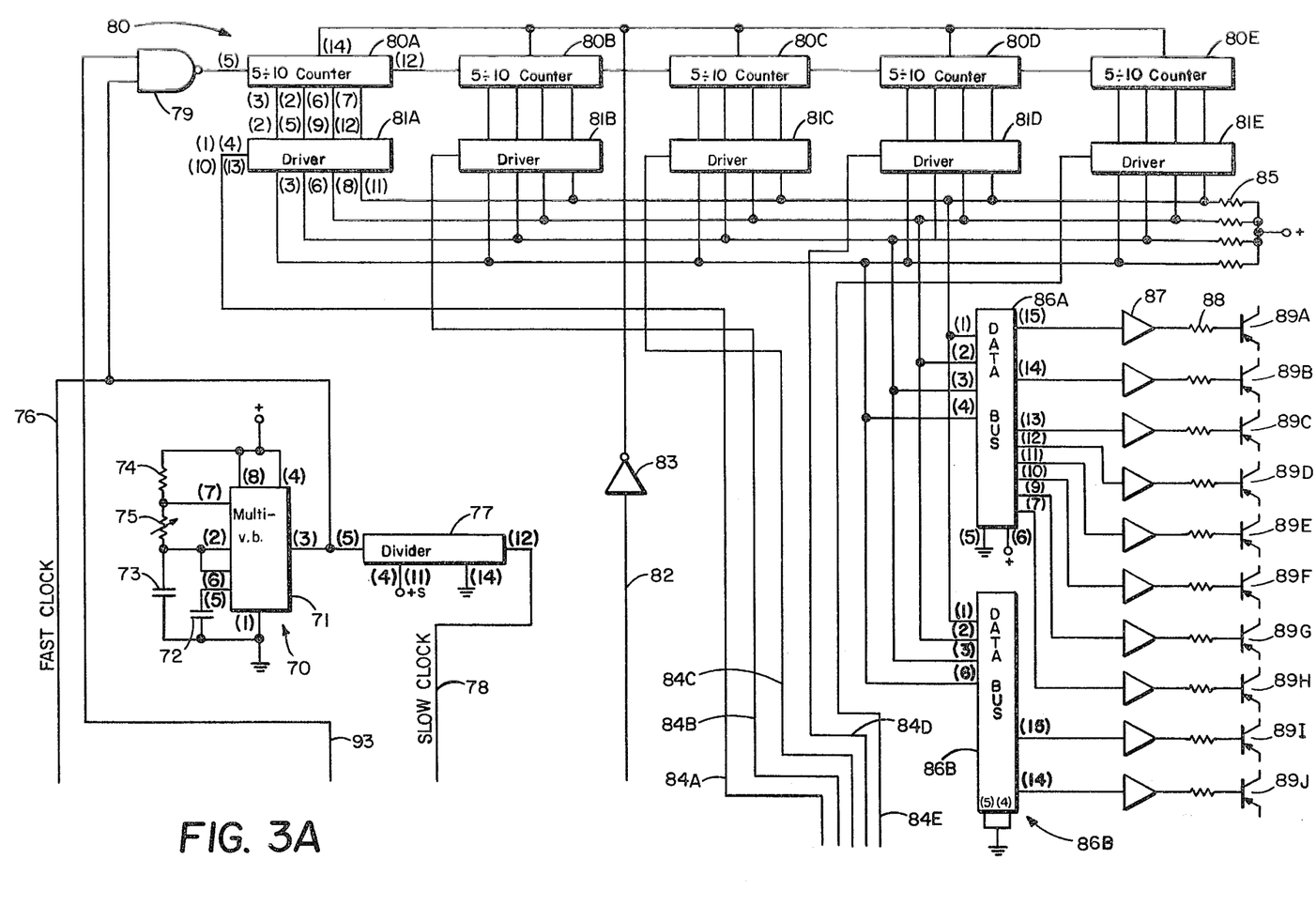

Referring now to FIGS. 3A through 3F, a more detailed description of each of the blocks shown in FIG. 2 will be given. The arrangement of FIGS. 3A through 3F is shown in FIG. 3. This arrangement results in each block in FIG. 2 having approximately the same location in both FIG. 2 and FIG. 3. The component parts of the circuits shown include switches, resistors, capacitors, transistors, OR gates, NAND gates, inverters, open collector drivers, flip-flops, commercially available integrated circuit (I.C.) chips, and commercially available calculators. The electronic components are shown by their standard electronic circuit symbols. A switch is shown at 2 (FIG. 3B), a resistor is shown at 96A a capacitor is shown at 73 (FIG. 3A), a NAND gate at 79, an OR gate at 110A (FIG. 3B), a transistor at 114A, an open collector driver at 111A, and an inverter at 83 (FIG. 3A). In addition, an inverted triangle at the end of a line designates a ground such as at 91 (FIG. 3B), while positive voltage inputs are shown by a + sign at the end of a line, such as at 92.

Figure 3B:
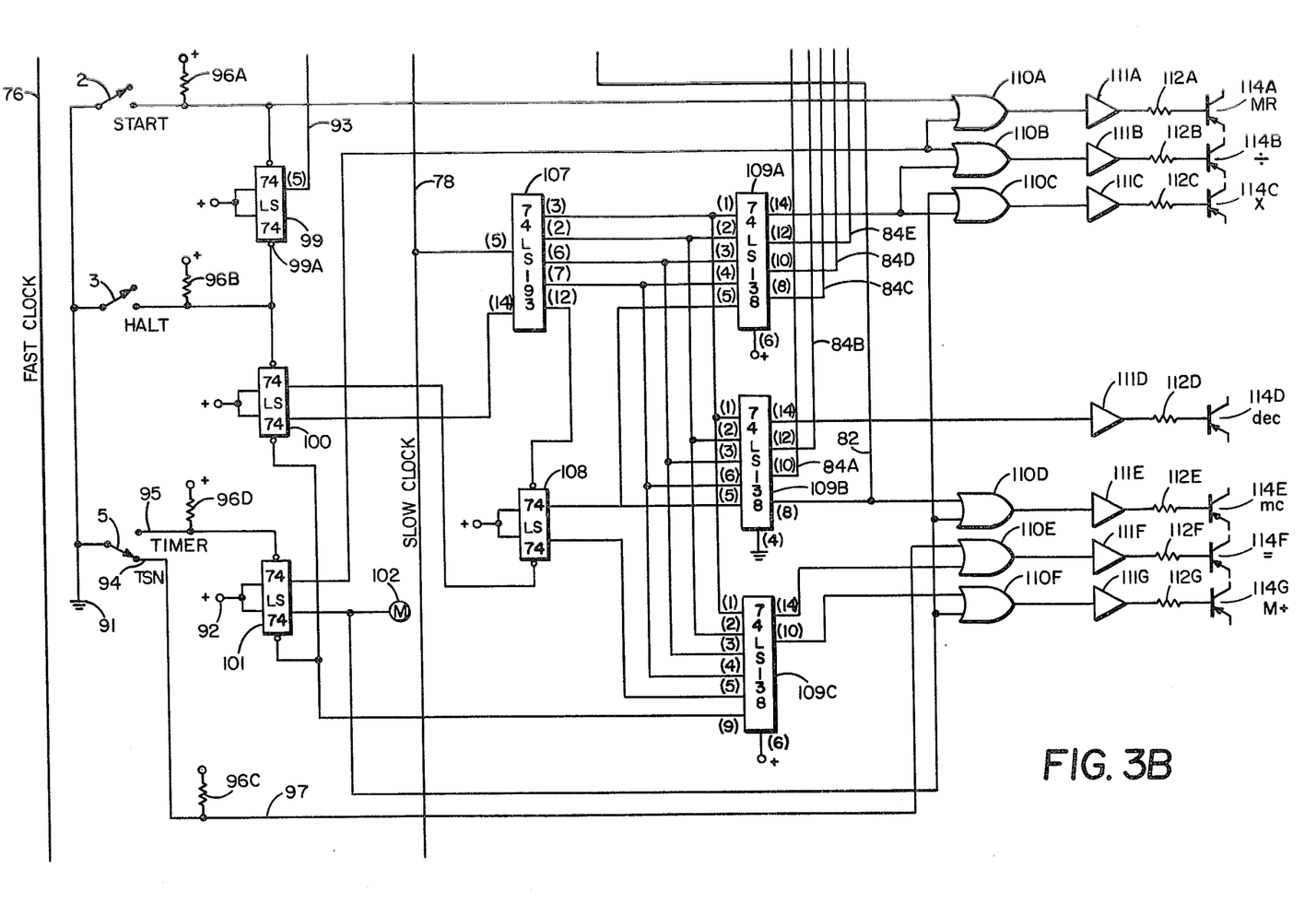

Each flip-flop is designated by a rectangle having longer vertical sides, such as shown at 99 in FIG. 3B. Inputs to each flip-flop are from the left side with the upper input being a data input and the lower input being a clock input. The outputs of each flip-flop are on the right side with the upper output being the conventional "Q" output and the lower output representing the conventional "$\overline{Q}$" output. The flip-flops shown also are provided with a present input and clear input the preset input being applied to the top of the rectangle and the clear input being applied to the bottom of the rectangle.

As is well-known in the art the signals applied to inputs and supplied at outputs in a digital circuit are all either at 0 voltage or at a fixed positive voltage which in this case is a +5 volts. The 0 voltage state alternatively is referred to as a logic "0" or a "0" state, a "low" state or a "false" state. The positive voltage state is alternatively referred to as a logic "1" or "1" state, a "high" state, or a "true" state. We shall refer herein insofar as possible to these voltages as a logic "0" or a logic "1" state.

The preset and clear inputs of the flip-flops shown are inverted inputs which are designated in the conventional fashion by a small open circle at the input as at 99A. The inverted inputs change the input to the opposite state from the incoming line state; that is, a logic "0" line state is input into the flip-flop as a logic "1" while a logic "1" line state is input as a logic "0" state.

As is well-known in the art a logic "1" signal applied to the preset of a flip-flop causes the Q output to assume a logic "1" state and the $\overline{Q}$ output to assume a logic "0" state. Conversely a logic "1" signal applied to the clear input causes the Q output to assume a logic "0" state and the $\overline{Q}$ output to assume a logic "1" state. Whenever a signal which changes from a logic "0" to a logic "1" is applied at the clock input of the flip-flop the Q output assumes a logic value equal to the logic value of the signal applied to the data input of the flip-flop, and the $\overline{Q}$ output to assume the opposite value, provided that the preset and clear inputs are at a logic "0" state.

The output of a NAND gate is normally a logic "1" signal unless the signal applied to each of the inputs thereof is a logic "1" in which case the output is a logic "0" signal.

The output of an OR gate is a logic "1" if any of the inputs is a logic "1" and a logic "0" if all of the inputs are a logic "0". The output of a NOR gate is a logic "1" if all of the inputs are at a logic "0" state, and at a logic "0" if any of the inputs are in a logic "1" state.

The flip-flops and IC chips used in the invention are standard, commercially available items, which are identified below by their standard alpha-numerical designations, such as 74LS32. These items are manufactured with numbered terminals. In the description of the invention below, some connections are described in terms of the terminals of the flip-flops and chips to which the connection is made. Such terminal designations will be indicated both in the specification and the drawing by numerals enclosed in parentheses, such as (1).

Turning to FIG. 3A the pulse generating means or clock 70 comprises a multivibrator 71 run in an astable mode, with its (1) terminal grounded and its (8) terminal and (4) terminal at +5 volts. A 0.01 microfarad capacitor is connected across terminals (5) and (1). Terminals (2) and (6) are short circuited and a 1.0 microfarad capacitor is connected between them and terminal (1). Terminals (8) and (4) are short circuited and a 3.3 kilo ohm resistor is connected between them and terminal (7). A variable resistor variable from about 3 to 4 kilo ohms is connected across terminals (7) and the (2) and (6) combination. The variable resistor is adjusted so that a 100 Hz signal is output from terminal (3). Output terminal (3) of the 555 multivibrator is connected to terminal (5) of a 74LS193 divider integrated circuit chip 77. Terminals (4) and (11) of chip 77 are connected to the +5 volt input and terminal (14) is grounded to produce a 6.25 Hz output signal at terminal 12. Output terminal 12 is connected to slow clock output line 78. Terminal (3) of multivibrator 71 is also connected to fast clock output line 76 and to one of the inputs of NAND gate 79. The other input to NAND gate 79 is connected to terminal (5) of flip-flop 99 which will be discussed below in relation to FIG. 3B. If the latter input coming from flip-flop 99 is positive then each fast clock pulse results in an output pulse from NAND gate 79.

Counter 80 is responsive to the output pulses from NAND gate 79. It comprises a bank of five divided by ten 74LS192 counters. In order to avoid cluttering the drawing with duplicative numbers the terminal designations are shown in the drawing only for the first counter 80A, the terminals of the other counters, 80B through 80E, being arranged similarly. The (5) terminal of counter 80A is connected to the output of NAND gate 79 and output terminal (12) is connected to the input terminal (5) of the next counter 80B. Likewise the input terminal (5) of each successive counter is coupled to the output terminal (12) of the preceding counter in the chain. Terminal (14) of each 74LS192 counter 80A through 80E is connected to the output of inverter 83, the input of which is coupled to chip 109B in FIG. 3B via line 82. A logic "1" signal output from inverter 83 resets each of counters 80A through 80E. The contents of counters 80A through 80E are read by a bank of 74LS125 tri-state bus drivers 81A through 81E. Again, the terminal designations are shown in the drawing only for the first bus driver 81A the terminals for the other drivers, 81B through 81E, being arranged similarly. The (3), (2), (6), and (7) output terminals of each counter 80A through 80E are coupled to the (2), (5), (9), and (12) inputs respectively of the associated tri-state bus driver 81A through 81E respectively. The (1), (4), (10), and (13) input terminals of tri-state bus drivers 81A through 81E are connected to lines 84A through 84E respectively which in turn are connected to output terminals of integrated circuit chips in FIG. 3B which will be discussed below. A logic "1" signal placed on each of these input lines 84A through 84E causes the content of its associated counter to be read onto data bus 86. Data bus 86 comprises a pair of 74LS138 integrated circuit chips 86A and 86B. The (11) output terminals of the drivers 81A through 81E are connected to each of the (1) input terminals of chips 86A and 86B. The (8) output terminals of drivers 81A through 81E are connected to the (2) input terminals of chips 86A and 86B. The (6) output terminals of drivers 81A through 81E are connected to the (3) input terminals of chips 86A and 86B, and the (3) ouput terminals of driver 81A through 81E are connected to the (4) terminal of chip 86A and the (6) terminal of chip 86B. Each of the lines connecting output terminals of drivers 81A through 81E with input terminals of chips 86A through 86B is connected to a +5 volt source through a 3.5K ohm resistor 85 so that these terminals normally are held at a logic "1" but fall to an essentially 0 voltage state when the appropriate terminals of drivers 81A through 81E are switched to the logic "0" state. The (5) terminal of chip 86A is grounded while the (6) terminal of the same chip is held at the +5 volts. Terminals (5) and (4) of chip 86B are grounded. The output terminals of chips 86A and 86B are normally in a logic "1" state. When one of these terminals falls to a logic "0" state it triggers one of the numerical "keys" of the calculator 190 (FIG. 3E). Outputs (15), (14), (13), (12), (11), (10), (9), and (7) of chip 86A and outputs (15) and (14) of chip 86B trigger "keys" 0 through 9 respectively of calculator 191. Each of the above outputs is connected to a type 7407 open collector driver, such as 87, which is in turn connected to a 3906 PNP transistor, such as 89, through a 33K ohm current limit resistor, such as 88. The collector of each 3906 transistor, such as 89A, is connected to one of six input lines of calculator 190, and each emitter is connected to one of four strobe lines of the same calculator. These connections will be described more completely in the discussion below with respect to FIG. 3E. The calculator "keys" are triggered in following manner: when the output of chip 86A or chip 86B goes to logic "0" its respective 7407 driver, such as 87, pulls low on the base of the transistor, such as 89A; when a positive strobe is output from the appropriate strobe line of the calculator it forward biases the base-emitter junction turning on the transistor into saturation and effectively causing a short between the strobe and input line, thus simulating someone pushing a key connected between the two lines.

Turning now to FIG. 3B, there is shown a detailed representation of the circuit for the sequencer of system A. Single pull double throw switches 2, 3, and 5 have been discussed above in relation to FIG. 1. The single throw of the three switches is grounded. The upper throw of switches 2 and 3 is a floating position, while the upper throw of switch 5 is connected to the inverted preset input of flip-flop 101. The lower throw of switch 2 is connected to the preset input of flip-flop 99 and one of the inputs to OR gate 110A. The lower throw of switch 3 is connected to the inverted clear input of flip-flop 99 and the inverted preset input of flip-flop 100. The lower throw of switch 5 is connected to one input of OR gate 110E. The input lines connected to the lower throw of switches 2, 3 and 5, and the upper throw of switch 5 are connected to the +5 volt power source through 3.3K ohm resistors 96A through 96D respectively. Thus these input lines are held at the logic "1" when the throws to the respective lines are in the open position and are in essentially the zero voltage state when the throws are in the closed position and the lines are grounded. Flip-flops 99, 100, 101, and 108 are each type 74LS74 flip-flops. Integrated circuit chip 107 is of type 74LS193, while chips 109A, 109B and 109C are type 74LS138 integrated circuit chips. The data inputs and the clock inputs of flip-flops 99, 100, 101 and 108 are held in the logic "1" state therefore the condition of the outputs is determined only by the condition of the preset and clear inputs. In the operation of the measuring system, or in the initial turning on operation switch 3 is always closed after switch 2. This condition, i.e. switch 2 in the upper open position and switch 3 in the lower closed position puts the preset input of flip-flop 99 at logic "0" and the clear input at logic "1" thus the Q output will be in the logic "0" state. When switch 2 is closed the preset input to flip-flop 99 will be momentarily held at the logic "1" state, and since switch 3 is normally in the open position and thus the clear input is normally at a logic "0" state, this will place the Q output in the logic "1" state which signal is transmitted through line 93 to NAND gate 79 in FIG. 3A to initiate the time count. As will be seen below the clear input to flip-flop 101 is set at logic "1" prior to a run. Thus if switch 5 is in the lower "TSN" position, then the preset input of flip-flop 101 will be at logic "0" and the Q output to be logic "0" and thus the closing of switch 2 will also cause a momentary logic "0" output from OR gate 110A which will cause driver 111A to pull low on the base of transistor 114 which will in effect close the circuit across transistor 114, as described above in relation to FIG. 3A. As will be described below, the emitter and collector of transistor 114A are connected between input and strobe lines of calculator 190 such that the memory recall function of the calculator is enabled by the momentary closing of the transistor "key".

The Q output of flip-flop 100 is coupled to the inverted clear input of flip-flop 108 and the $\overline{Q}$ output of flip-flop 100 is coupled to the (14) input terminal of IC chip 107. The Q output of flip-flop 101 is coupled to one input of OR gate 110A (already discussed above) and one input of OR gate 110B. The $\overline{Q}$ output of flip-flop 101 is coupled to the keyboard "A" enable input 102 (see also FIG. 3F), and to one of the inputs of each of OR gates 110C, 110D and 110F. The inverted clear inputs of flip-flops 100 and 101 are connected and responsive to the terminal (9) output of IC chip 109C. The (5) input terminal of IC chip 107 is connected and responsive to the slow clock pulse communicated through line 78. The Q output of flip-flop 108 is connected to the (5) input terminal of IC chips 109A and 109B, while the $\overline{Q}$ output of the same flip-flop is connected to the (5) input terminal of flip-flop 109C. The (6) input terminal of IC chips 109A and 109C are held at the 5 volt "high" voltage while the (4) input terminal of IC chip 109B is held at ground. Output terminal (3) of IC chip 107 is connected to the (1) input terminal of IC chips 109A, 109B and 109C. Output terminal (2) of IC chip 107 is connected to the (2) input terminal of IC chips 109A, 109B and 109C. Likewise the (6) output of chip 107 is connected to the (3) inputs of chips 109A through 109C. Output terminal (7) of IC chip 107 is connected to the (4) input terminal of chips 109A and 109C and the (6) input terminal of chip 109B. The (12) output terminal of chip 107 is coupled to the preset input of flip-flop 108. Output terminal (14) of IC chip 109A is coupled to one input of OR gate 110B and also to one input of OR gate 110C. Output terminal (12) of IC chip 109A is coupled to the counter read enable input of bus driver 81E in FIG. 3C through line 84E as described above. Similarly, output terminals (10) and (8) of chip 109A and (12) and (10) of chip 109B are connected to the counter enable terminals of drivers 81D, 81C, 81B and, 81A respectively through lines 84D, 84C, 84B and 84A respectively. The signal from output terminal (14) of IC chip 109B is applied to 7407 open collector driver 111D which in turn pulls low through 33K ohm resistor 112D on the base of 3906 PNP transistor 114D thereby triggering the decimal "key" on calculator 190 in the same manner as described above. The signal from ourput terminal (8) of chip 109B is applied through line 82 to the counter clear input of counters 80A through 80E, through inverter 83, as described above in relation to FIG. 3A, and is also applied to one input of OR gate 110D. Output terminals (14) and (10) of IC chip 109C are connected to one input of OR gates 110E and 110F respectively. When both inputs of OR gate 110B are low the gate causes driver 111B to pull low on 3906 PNP transistor 114B through 33K ohm resistor 112B to trigger the divide "key" of calculator 190 in the same manner as described earlier. Similarly, OR gates 110C, 110D, 110E and 110F trigger the multiplication, memory clear, equals, and memory plus "keys" respectively of calculator 190.

Figure 3C:
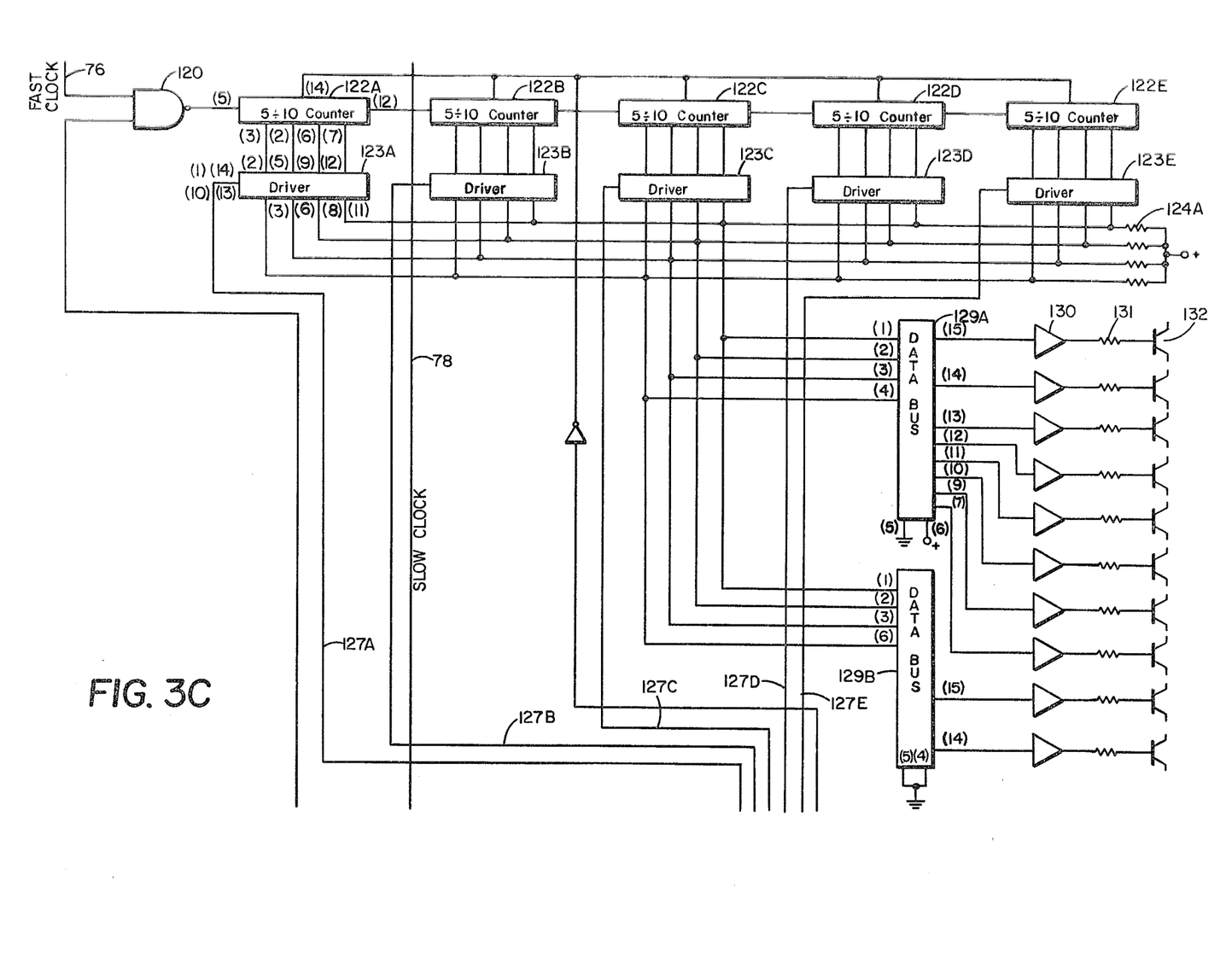

The circuit of FIG. 3C is identical to the circuit of FIG. 3A except that the input lines 127A through 127E to the counter read enable terminals of tri-state bus drivers 123A through 123E respectively are coupled to the circuit of the sequencer for system B (see FIG. 3D) and the outputs of type 74LS138 integrated circuit chips 129A and 129B trigger the zero through nine numerical "keys" on the calculator for system B.

Figure 3D:
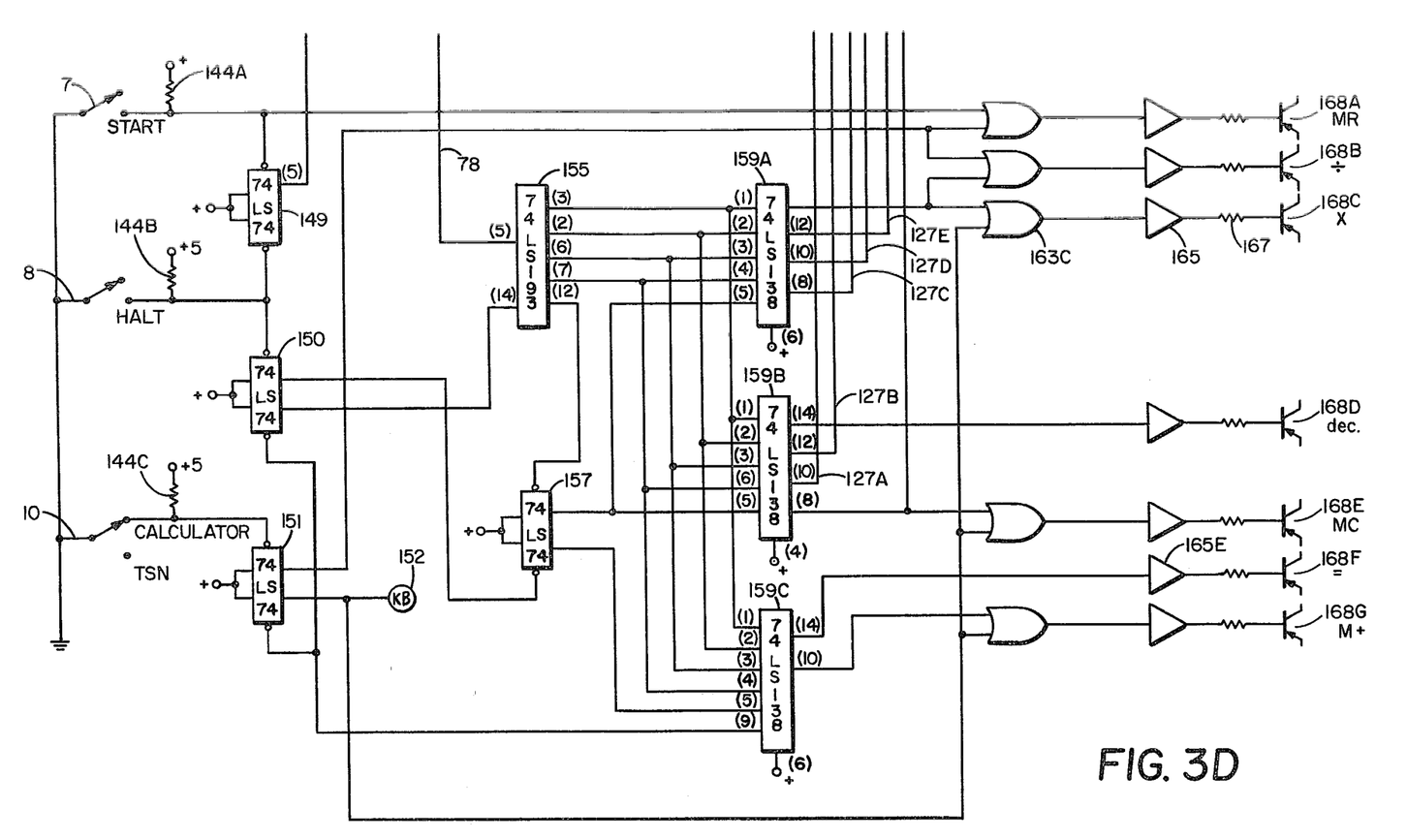
Figure 3E:
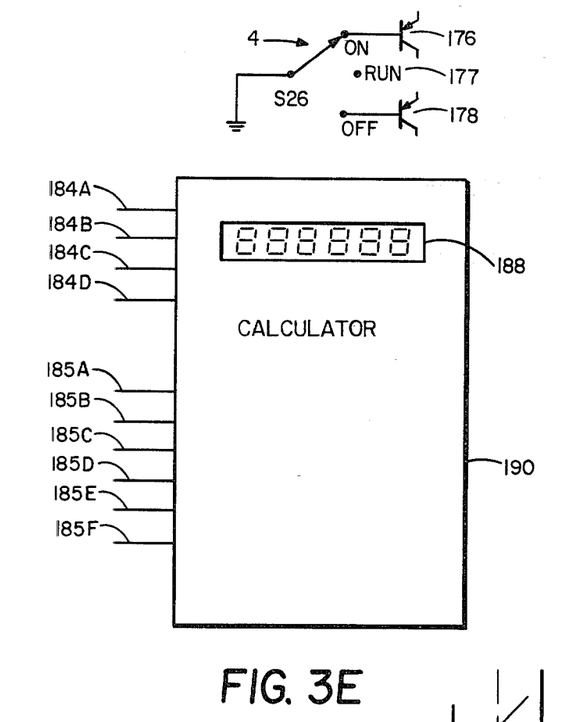

FIG. 3D is also nearly identical to FIG. 3B with a few exceptions. Switches 7, 8, and 10 are the single pull double throw switches that were discussed earlier with respect to FIG. 1. In this case the output terminals (12), (10), and (8) of IC chip 159A and terminals (10) and (12) of IC chip 159B are applied to the counter read input terminals of bus drivers 123A through 123E through lines 127A through 127E as described above with reference to FIG. 3C. Similarly 3906 PNP transistors 168A through 168G trigger the memory recall, divide, multiplication, decimal, memory clear, equals, and memory plus "keys" of the calculator for system B. The primary difference between the circuits of FIGS. 3B and 3D is that the "timer" circuit is not included in the circuit of FIG. 3D. The (14) output terminal of type 74LS138 IC chip 159C connects directly to driver 164E rather than through an OR gate as in FIG. 3B, and the "TSN" throw of switch 10 is a neutral floating throw, unlike the analogous throw in FIG. 3B.

Turning now to FIG. 3E the connections to calculator 190 are shown. Single pole triple throw switch 4 has been discussed above in connection with FIG. 1. The single pole of the switch is grounded. The upper throw of the switch is connected to 3906 PNP transistor 176, the middle throw 177 is a floating position, and the lower throw is connected to type 3906 PNP transistor 178. The emitter of transistor 176 is connected to a strobe line of calculator 190 and the collector is connected to an input line of the calculator such that when the base is grounded by placing switch 4 in the upper position to turn the transistor on, the "on key" of calculator 190 is triggered. Similarly the grounding of the base of transistor 178 by turning switch 4 to the lower position triggers the "off key" of calculator 190.

Calculator 190 is a commercially available calculator such as a four function/one memory calculator produced by Texas Instruments Incorporated, P.O. Box 5012, Dallas, Tex., and is well-known in the art and thus the description will be limited to the connections between the calculator and the rest of the circuit. The calculator has four strobe lines 184A through 184D and six input lines 185A through 185F. As is well-known in the art closing the circuit between any one of the strobe lines and any one of the input lines will trigger one of the numerical or algebraic functions built into the calculator, with a different function being triggered for each different combination of strobe line with input line. Since there are four strobe lines and six input lines the calculator has a capacity for 24 possible key switches. The particular "key switches" enabled by the strobe line/input line combinations of the calculator are conventionally provided by the calculator manufacturer and this will not be discussed. As discussed above, transistor switches are used to complete the circuits between each strobe line and each input line, with the strobe line being connected to the emitter of the transistor and the input line being connected to the collector. Transistors 89A through 89J of FIG. 3A are connected across strobe lines and input lines of calculator 190 so as to enable numerical "keys" zero through nine respectively. Transistors 114A through 114G of FIG. 3B are connected across strobe lines and input lines so as to enable the memory recall, divide, multiply, decimal, memory clear, equals, and memory plus "keys" respectively.

The calculator of system B is identical to the calculator of system A just described, and the connections between the calculator of system B and the circuits of FIGS. 3C and 3D are identical to the connections between calculator 190 and the circuits of FIGS. 3A and 3B, and therefore this calculator and the connections are not shown in a separate figure, and will not be discussed further.

The Texas Instruments single chip calculators used in the invention include the calculator and display modules as a unit. The calculators are disposed within the invention so that display 188 of calculator 190 and the display of the analogous calculator for system B fit within windows 33 and 34 respectively in instrument case 36 (FIG. 1). Keys 11, 12, 14 through 17 and 19 through 30 are conventional plastic calculator keys and conventionally protrude through openings in instrument case 36.

Figure 3F:
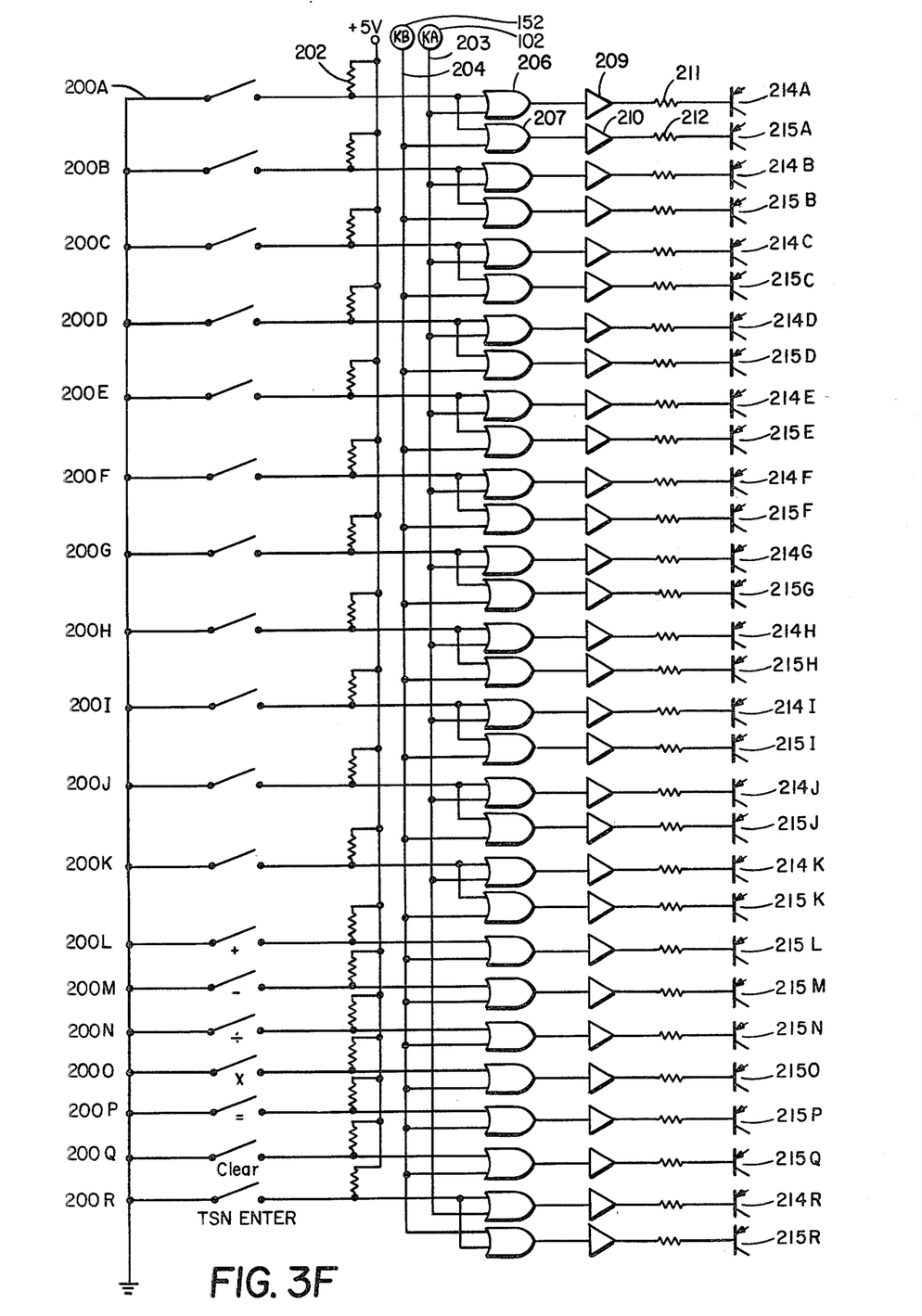

The circuitry associated with the keyboard is shown in FIG. 3F. Switches 200A through 200R are single pole single throw momentary contact switches. Switches 200A through 200J are activated by keys 20 through 29 respectively (FIG. 1). Switches 200K through 200R are activated by keys 19, 17, 14, 15, 16, 12, 11, and 30 respectively. The pole of each switch is grounded, while the throw of each switch is connected to the +5 volt source through a 3.3K ohm resistor. The circuit for each switch comprises a pair of OR gates such as 206 and 207, a pair of type 7407 open collector driver stages such as 209 and 210, a pair of 33K ohm current limit resistors such as 211 and 212, and a pair of 3906 PNP transistors such as 214 and 215. The connections and operation of only the circuit for switch 200A will be described since the circuits for the other switches and the operation of the circuits is identical. The throw of switch 200A is connected to one of the inputs of each of OR gates 206 and 207. The second input to OR gate 206 is connected to the keyboard "A" enable output 102 (see FIG. 3B) through line 203. The second input to OR gate 207 is connected to the keyboard "B" enable output 152 (see FIG. 3D) through line 204. The output of OR gate 206 is connected to the input of driver stage 209 and the output of the driver stage is connected through resistor 211 to the base of transistor 214A. Similarly the output of OR gate 207 is connected to the input of driver stage 210, and the output of the driver stage is connected through resistor 212 to the base of transistor 215A. The emitter of transistor 214A is connected to the strobe line of calculator 190 and the collector is connected to the input line of the same calculator such that the numerical zero "key" of calculator 190 will be triggered when transistor "switch" 214A is closed as described above. Similarly the emitter and collector of transistor 215A are connected across the analogous strobe and input lines of the calculator for system B so that the numerical zero "key" of that calculator is triggered when the circuit across the emitter and collector of transistor 215A is closed by drawing low on the base. When keyboard "A" enable 102 is in a high or logic "1" state the output of OR gate 206 is always in a high or logic "1" state, and thus the output of driver 209 is high and transistor 214A does not conduct and thus the numerical zero key of calculator 190 is disabled. When input 102 is low OR gate 206 is responsive to the input connected to switch 200A. When switch 200A is open this input is held high and thus the 0 key is also disabled. However, when switch 200A is momentarily closed the input is grounded and is thus low causing the output of OR gate 206 to be low (since both inputs are low) which in turn causes driver 209 to pull low thereby closing transistor "switch" 214A as described above, and triggering the numerical zero "key" of calculator 190. Similarly, when keyboard "B" enable output 152 is high transistor 215A is open circuited disabling the numerical zero "key" of the calculator of system B, but when output 152 is low OR gate 207 is responsive to the input from switch 200A, and when this switch is closed the OR gate and the driver pulls low closing the circuit across transistor 215A and enabling the numerical zero "key" of the calculator for system B. As mentioned above, the circuits for the other switches 200A through 200R are connected and operate in the same manner except that the circuits for switches 200M through 200Q include only the system "B" circuit; that is the circuit has one OR gate such as 207M, one driver stage such as 210M, one resistor such as 212M and one transistor such as 215M which are coupled to "B" output 152 and which trigger "keys" in the calculator of system B as described above. Transistors 214B through 214J are connected between strobe and input lines of calculator 190 so that they trigger calculator 190 "keys" for the numerical functions one through nine respectively, Likewise transistors 215B through 215J trigger the numerical function "keys" one through nine respectively in the calculator for system B. Transistor 214K triggers the decimal function in calculator 190, while 215K triggers the decimal function in the calculator for system B. Transistors 215L through 215Q trigger the plus, minus, divide, multiply, equals, and memory clear functions respectively in the calculator for system B. Switch 200R is the switch corresponding to the TSN enter function and transistors 214R and 215R trigger the memory plus function "key" in the calculators for system A and system B respectively.

The multivibrator 71 employed in the embodiment of the invention described is a type 555 multivibrator produced by National Semiconductor Corp. of 2900 Semiconductor Drive, Santa Clara, Calif. 95051 and designated as LM555.

The 5 volt power source employed in the invention may be provided in any conventional manner such as by batteries, by AC/DC converters which may be plugged into conventional AC lines, or a conventional adaptor and voltage converter which may be plugged into the conventional cigarette lighter of an automobile. The latter power source is preferred by the embodiment described.

The OR gates of the switch circuits shown in FIG. 3G are implemented in the embodiment shown in transistor-transistor logic with type 74LS32 integrated circuit chips which allow four gates to be implemented on each chip. The embodiment described herein uses low powered Shockley logic. It will be evident to those skilled in the art that the circuits can also be implemented in many other types of logic including CMOS logic. CMOS logic would enable the circuit to be built with a reduced number of parts; for example the keyboard multiplexer could be run directly off the logic thus eliminating one level of drivers. The CMOS circuit would also use less power and thus could be run from smaller batteries, for example six C size batteries, rather than the present heavier batteries. This is possible because a CMOS circuit may be run off the 9 volt power supply which will reverse bias the base emitter junction, shutting off the transistor when the logic is high rather than relying upon open collector logic.

The operation of the system will be described primarily for the "A" system shown in FIGS. 3A, 3B, 3E and 3F, since the "B" system works in an identical manner except for a few operations which will also be discussed. The system is put into setup mode by first pressing switch 2 once and then switch 3 which clears counters 80A through 80E. Switch 5 is then switched out of TSN and then back into TSN which enables the keyboard. The speed of the setup car is then entered into calculator 190 using keys 19 through 29. When the setup car passes the first fixed point, switch 2 is pressed which enables counters 80A through 80E. When the setup car passes the second fixed point switch 3 is pressed which clears flip-flop 99 to stop the counters and presets flip-flop 100 which initiates a sequence of operations within the circuit. First OR gate 110C goes low triggering the multiplication function in the calculator, then the counter bus drivers 81E, 81D, and 81C are enabled in that order to read the three most significant digits from the counter into the calculators by way of chips 86A and 86B triggering the appropriate numerical "keys" in the calculator, the terminal (14) of IC chip 109B goes low triggering the decimal point function in the calculator, then terminals (12) and (10) of IC chip 109B go low so that bus drivers 81B and 81A are enabled in that order to read the two most significant digits into the calculator through chips 86A and 86B, then terminal 8 of chip 109B and terminals (14) and (10) of chip 109C go low in that order triggering the calculator functions memory clear, equals and memory plus in that order. This takes the speed of the setup car in the accumulator, multiplies it by the time the counters counted between switch 2 and 3 being pressed, and stores the resulting TSN number in the calculator memory.

The TSN number may also be entered into the calculator directly by punching the number directly into the keyboard after the keyboard is enabled in the sequence of setup operations as described above, then pressing the TSN enter key 30 to close switch 200R. This triggers the memory plus function which takes the TSN number in the accumulator of calculator 190 and places it into the memory of the calculator. The system is now ready to measure the speed of a target vehicle moving over the course corresponding to the TSN number which was entered.

In the course of the above sequence of operations terminal (9) of IC chip 109C goes low which clears flip-flop 100 preparing it for another sequence of operations. The low signal from terminal (9) of chip 109C also clears flip-flop 101 which sets $\overline{Q}$ equal to 1 which disables the keyboard "A" circuit by drawing low on output 102 and disables OR gates 110C, 110D and 110F thereby disabling the multiplication, the memory clear and memory plus functions respectively. Clearing flip-flop 101 also sets the Q output of the flip-flop to a logic "0" state which enables OR gates 110A and 110B thereby enabling the memory recall and divide functions, which places the sequencer in speed measuring mode.

Switch 2 is pressed when a target vehicle passes the first fixed point which again enables counters 80A through 80E and triggers the memory recall function which recalls the TSN number to the display and accumulator for calculator 190. Switch 3 is pressed when the target vehicle passes the second fixed point which initiates a sequential triggering of the enabled functions. First terminal (14) on chip 109A goes low triggering the divide function, then terminals (12), (10) and (8) each go low in turn reading the three most significant digits from counter 180E, 180D, and 180C respectively into the calculator, then terminal (14) on chip 109B goes low triggering the decimal function, then terminals (12) and (10) go low in that order reading the two least significant digits from counters 80B and 80A, then terminal (14) on IC chip 109C goes low triggering the equals function in the calculator. This effectively recalls the TSN number, divides it by the time the target vehicle took between the two points and displays it. In the course of the above sequence terminal (8) of IC chip 109B goes low after the counter is read, which pulls low on line 82 and resets counters 80A through 80E spreading them for the next run. Terminal (9) on IC chip 109C also goes low at the end of the sequence which clears flip-flop 100 preparing it for another sequence of operations. The sequencer is then ready for another measurement.

In the above sequencer operations each "key" is "pressed" for 160 msec. and there are 160 msec. between each key being pressed, the total calculation taking about 5 sec.

If switch 5 is placed in the upper (timer) position then line 97 is held at a +5 volts which disables OR gate 110E thereby disabling the equals function in the sequence. Thus when a "measurement is made" the last number left in the display is the time the target vehicle took to travel between the two fixed points. Thus in this mode the invention may be used as a timer.

System "B" shown in FIGS. 3C, 3D, 3E, and 3G operates in the same manner as the "A" system just described in setup and speed measuring modes, and thus the operation in these modes will not be discussed further. If switch 10 is placed in the upper or calculator position, flip-flop 151 is preset which sets $\overline{Q}$ to a logic 0 which enables the "B system" keyboard circuit so that the keyboard of FIG. 1 will communicate with calculator of system "B". In this mode the invention may be used as a simple calculator.

If keys 5 and 10 are both in the TSN position during the setup process, the same TSN unit will appear for use in both upper and lower readouts. This may be desirable for example when the operator wishes to time two target cars, one following the other in the same direction.

Figure 4:
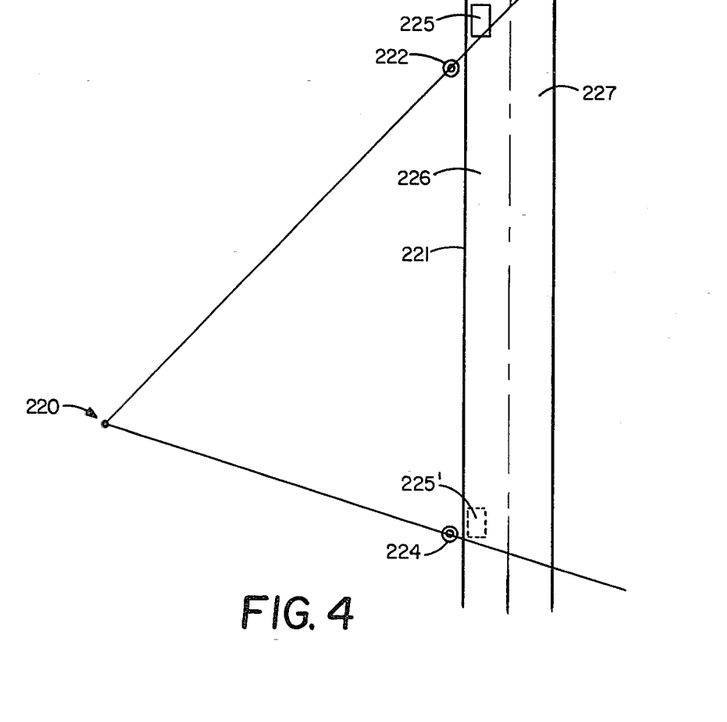
FIG. 4 is a diagrammatic illustration of one method of using the invention.

The use of the invention as a speed measuring instrument may be better understood in connection with FIG. 4. Prior to using the invention an observer stations himself or herself at point 200 some distance from highway 221. The observer chooses a first-fixed point 222 and a second-fixed point 224 along highway 221. If the observer decides to use system "A" of the invention he or she turns switch 4 (FIG. 1) to "on" and then to "run". Switches 2 and 3 are pressed in sequence to clear the counters and then switch 5 is pushed out of TSN and then back into TSN to place the system in the setup mode. The speed of the setup car is then punched into the calculator using keys 19 through 29 and it appears in display 1. The setup car is then driven (by a partner of the observer) along highway 11 in the lane of traffic flow which is to be checked, say lane 226, at the setup speed. Switch 2 is pressed when the setup car passes the first fixed point 222 and then switch 3 is pressed when the setup car passes the second fixed point 224. A time-speed number unit (TSN unit) will then appear in display 1. The invention is now prepared to measure the speed of any vehicle traveling in lane 226.

When a target vehicle 225 passes the first fixed point 222 switch 2 is pressed, and when it passes the second fixed point 224 (the vehicle is shown in ghost at 225′) switch 3 is pressed. The average speed of a target vehicle then appears in display 1. The speed of another target vehicle may be immediately measured in the same manner.

It can be easily seen by referring to FIG. 4 that the distance traveled between the two visual fixed points 222 and 224 will be larger for a target vehicle traveling in lane 227 than for a target vehicle traveling in lane 226. If it is desired to measure speeds of vehicles in lane 227 while also measuring speeds of vehicles in lane 226 then switch 9 may be turned on "on" and then to "run" and the setup procedure described above gone through using the analogous switches 7, 8, and 10.

The invention may also be used for measuring the distance between two fixed objects along the path of a vehicle. In the setup mode described above the TSN number produced by the invention accurately represents the distance between the first-fixed point 222 and second fixed point 224. Such a readily available distance measurement device can be useful to police and others for a wide variety of purposes.

Once this TSN number has been determined for a given setup speed and a given setup observation point 220, and fixed points 222 and 224 it is not necessary to use a setup car. Instead of punching the setup speed into the keyboard just prior to the setup run as described above, the observer may punch in the TSN number, and then press switch 30, whereupon the TSN number will appear on whichever of displays 1 or 6 is being used and the invention is immediately ready to measure speeds of target vehicles.

There has been described a novel apparatus for measuring the average speed of vehicles that is accurate, can be operated relatively unobtrusively, is relatively inexpensive to manufacture, and has numerous other features. It is evident that those skilled in the art may now make numerous uses and modifications of and departures from the specific embodiment described herein without departing from the inventive concepts. For example, one skilled in the art can devise circuitry which will automatically clear the counters and place the sequencer in setup mode each time the switches 4 or 9 are turned on. In addition, one skilled in the art of semiconductor electronics may devise simpler circuits using the TTL logic or any one of a number of other types of semiconductor logic and/or devices. The invention may be used for many purposes other than by police measuring the speed of traffic law violators, for example in measuring the speed of automobiles, horses, planes, etc. during races. The invention may be used for any purpose requiring the measurement of one or two vehicles or any other moving object over different courses, from different positions, etc. Many other variations and uses may be described. Consequently the invention is to be construed as embracing each and every novel feature and novel combination of the features present and/or possessed by the speed measuring apparatus herein described.

What is claimed is:

1. Apparatus for measuring the average speed of a vehicle traveling between two line-of-sight reference points from a stationary observation point comprising:
   means for entering a set-up speed into said apparatus;
   means for utilizing said set-up speed to determine a comparison time-speed unit representing the distance traveled by a set-up vehicle moving between the line-of-sight reference points;
   means for storing said comparison time-speed unit;
   time pulse generating means;
   time counter means for counting said time pulses;
   manually operated first-fixed-point switch for initiating the count of said time counter means when the vehicle passes a first reference point;
   manually operated second-fixed-point switch for terminating the count of said time counter means when the vehicle passes a second reference point;
   divide circuit means for dividing the comparison time-speed unit by the contents of said time counter whereby the resulting quotient is a measure of the vehicle speed; and
   speed readout means for displaying said vehicle speed.

2. Apparatus in accordance with claim 1 wherein said divide circuit means and said speed readout means are triggered by said manually operated second-fixed-point switch.

3. Apparatus as described in claim 1 wherein said means for storing comprises a digital memory and said means for entering comprises a keyboard and a digital circuit communicating between said keyboard and said digital memory.

4. Apparatus as described in claim 1 wherein said means for utilizing said set-up speed to determine a comparison time-speed unit comprises:
   said time pulse generating means;
   said time counter means;
   said manually operated first-fixed-point switch;
   said manually operated second-fixed-point switch; and
   multiplication circuit means for multiplying said set-up speed by the contents of said timer whereby the resulting multiplicand represents said comparison time-speed unit.

5. Apparatus in accordance with claim 4 wherein there are two of said means for storing, two of said time counter means, two of said first-fixed-point switches, two of said second-fixed-point switches, and two of said speed readout means, whereby two of said measurements of a vehicle speed may be performed simultaneously.

6. Apparatus as described in claim 4 including a bistable means capable of being triggered to either a first or a second state and a means for triggering said bistable means into said first state for determining said comparison time-speed unit and for triggering said bistable means into said second state for determining said vehicle speed, and wherein:
   said multiplication circuit means is enabled for determining said comparison time-speed unit when said bistable means is in such first state; and
   said divide circuit means for determining said vehicle speed is enabled when said bistable means is in said second state.

7. Apparatus as described in claim 6 wherein said bistable means is triggered from said first state into said second state whenever said comparison time-speed unit is entered into said means for storing.

8. Apparatus for measuring the average speed of a vehicle traveling between two line-of-sight reference points from a stationary observation point, comprising:

initiation signal means for producing an initiation signal;

electronic means for storing a number;

means for entering a set-up speed into said means for storing;

electronic time pulse generating means;

electronic time counter means for counting said time pulses;

manually operated first-fixed-point means for initiating the count of said time counter means when a vehicle passes a first reference point;

manually operated second-fixed-point means for terminating the count of said time counter means when a vehicle passes a second reference point;

multiply circuit means for multiplying said set-up speed in said means for storing by the contents of said time counter and entering the resulting comparison time-speed unit in said means for storing and for producing a speed mode signal;

divide circuit means for dividing the comparison time-speed unit in said means for storing by the contents of said time counter whereby the resulting quotient is a measure of the vehicle speed;

enable/disable means responsive to said initiation signal and said speed mode signal for enabling said multiply circuit means and disabling said divide circuit means upon reception of said initiation signal and for disabling said multiply circuit means and enabling said divide circuit means upon the reception of said speed mode signal; and speed readout means for displaying said vehicle speed.

9. Apparatus as described in claim 8 wherein said enable/disable means comprises a bistable means capable of being triggered to either a first or a second state and means for triggering said bistable means into said first state in response to said initiation signal and for triggering said bistable means into said second state in response to said speed mode signal, and wherein:

said multiply circuit means is enabled when said bistable means is in first state; and said divide circuit means is enabled when said bistable means is in said second state.

* * * * *